US010455965B1

(12) United States Patent
Amati

(10) Patent No.: US 10,455,965 B1
(45) Date of Patent: Oct. 29, 2019

(54) POSTAL DELIVERY NOTIFICATION SYSTEM

(71) Applicant: Quentin Amati, Delray Beach, FL (US)

(72) Inventor: Quentin Amati, Delray Beach, FL (US)

( * ) Notice: Subject to any disclaimer, the term of this patent is extended or adjusted under 35 U.S.C. 154(b) by 273 days.

(21) Appl. No.: 15/584,246

(22) Filed: May 2, 2017

(51) Int. Cl.
*A47G 29/12* (2006.01)
*A47G 29/122* (2006.01)
*H04L 29/08* (2006.01)

(52) U.S. Cl.
CPC ..... *A47G 29/1214* (2013.01); *A47G 29/1201* (2013.01); *A47G 29/1225* (2013.01); *H04L 67/12* (2013.01); *A47G 2029/1226* (2013.01)

(58) Field of Classification Search
CPC ............ A47G 29/1214; A47G 29/1212; A47G 29/30; A47G 29/1201; A47G 29/1225; A47G 2029/1226; A47G 2029/148; A47G 2029/149; H04L 67/12
USPC .................. 232/19, 34–37, 17, 45; 340/569; 200/61.63, 61.59
See application file for complete search history.

(56) References Cited

U.S. PATENT DOCUMENTS

| | | | | |
|---|---|---|---|---|
| 2,968,804 A * | 1/1961 | Buffington | ......... | A47G 29/1225 232/34 |
| 4,633,236 A * | 12/1986 | Buhl | .................. | A47G 29/1212 232/37 |
| 4,651,135 A * | 3/1987 | Duhaime | ........... | A47G 29/1212 200/61.63 |
| 4,794,377 A * | 12/1988 | Benages | ............ | A47G 29/1214 232/37 |
| 4,868,543 A * | 9/1989 | Binkley | ............. | A47G 29/1214 340/569 |
| 5,060,854 A * | 10/1991 | Armstrong | ......... | A47G 29/1214 232/37 |
| D338,632 S | 8/1993 | Colberg | | |
| 5,861,805 A * | 1/1999 | Reeves | .............. | A47G 29/1207 340/539.23 |
| 5,898,371 A * | 4/1999 | Marek | ................ | A47G 29/1225 200/61.63 |
| 6,028,517 A * | 2/2000 | Sansone | ............. | A47G 29/1212 232/34 |
| 6,046,675 A * | 4/2000 | Hanna | ................ | A47G 29/1214 200/61.52 |
| 6,114,959 A | 9/2000 | Bennett | | |
| 6,275,154 B1 * | 8/2001 | Bennett | .............. | A47G 29/1214 340/569 |
| 6,462,659 B1 * | 10/2002 | Schuette | ........... | A47G 29/1214 340/569 |
| 6,831,558 B1 | 12/2004 | Andrew | | |

(Continued)

*Primary Examiner* — William L Miller
(74) *Attorney, Agent, or Firm* — Kyle A. Fletcher, Esq.

(57) ABSTRACT

The postal delivery notification system is an instrument that is configured for use with a mailbox. The postal delivery notification system is a sensor that monitors the contents of the mailbox. Specifically, the postal delivery notification system comprises a control system and a sensor. The sensor detects when a parcel is placed into or removed from the mailbox. The sensor is attached to the control system such that the control system receives a signal from the sensor that indicates that the parcel has been placed into or removed from the mailbox. The control system responds to the receipt of the signal by sending a first message to an appropriate authority indicating the introduction or removal of the parcel from the mailbox.

15 Claims, 5 Drawing Sheets

(56) References Cited

U.S. PATENT DOCUMENTS

| | | | |
|---|---|---|---|
| 7,025,249 B1 * | 4/2006 | Ledbetter | A47G 29/1214 232/34 |
| 7,486,948 B1 | 2/2009 | Vergon | |
| 7,680,253 B2 | 3/2010 | Kessler | |
| 7,786,862 B1 | 8/2010 | Campbell | |
| 7,843,340 B2 | 11/2010 | Davis | |
| 2002/0067262 A1 * | 6/2002 | Lie | A47G 29/1214 340/569 |
| 2006/0044139 A1 * | 3/2006 | St. Clair | G01V 8/12 340/569 |
| 2007/0181661 A1 * | 8/2007 | Davis | A47G 29/1214 232/34 |
| 2007/0279222 A1 * | 12/2007 | Carrigan | A47G 29/1201 340/540 |
| 2008/0067227 A1 * | 3/2008 | Poss | A47G 29/22 232/17 |
| 2008/0278323 A1 * | 11/2008 | Jackson | G08B 3/10 340/569 |

* cited by examiner

POSTAL DELIVERY NOTIFICATION SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of instruments and signaling, more specifically, an alarm system sensitive to a single specified operating condition that is not elsewhere provided for.

SUMMARY OF INVENTION

The postal delivery notification system is an instrument that is configured for use with a mailbox. The postal delivery notification system is a sensor that monitors the contents of the mailbox. Specifically, the postal delivery notification system comprises a control system and a sensor. The sensor detects when a parcel is placed into or removed from the mailbox. The sensor is attached to the control system such that the control system receives a signal from the sensor that indicates that the parcel has been placed into or removed from the mailbox. The control system responds to the receipt of the signal by sending a first message to an appropriate authority indicating the introduction or removal of the parcel from the mailbox.

These together with additional objects, features and advantages of the postal delivery notification system will be readily apparent to those of ordinary skill in the art upon reading the following detailed description of the presently preferred, but nonetheless illustrative, embodiments when taken in conjunction with the accompanying drawings.

In this respect, before explaining the current embodiments of the postal delivery notification system in detail, it is to be understood that the postal delivery notification system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the postal delivery notification system.

It is therefore important that the claims be regarded as including such equivalent construction insofar as they do not depart from the spirit and scope of the postal delivery notification system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

Figure 1:
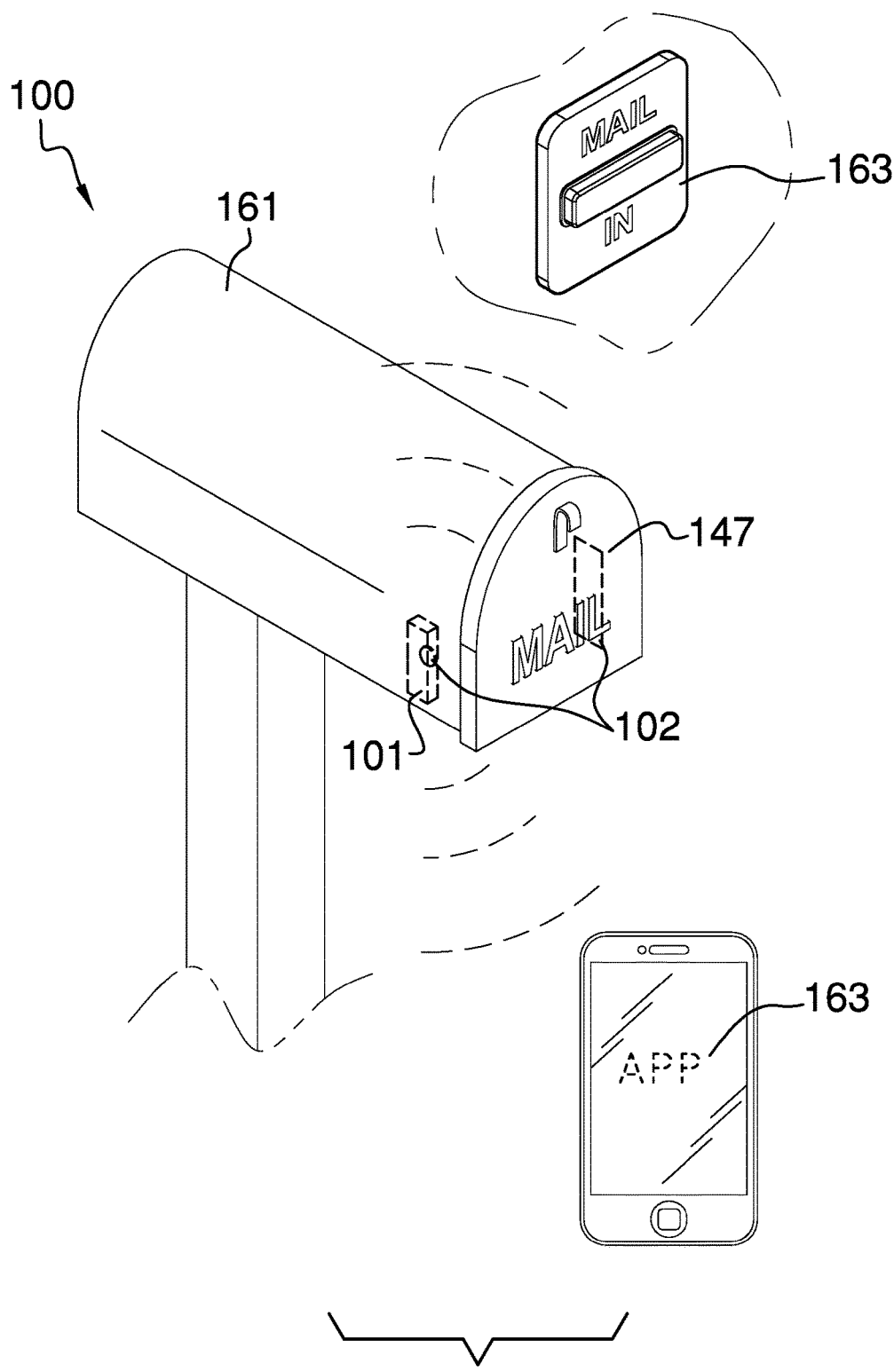
FIG. 1 is a perspective view of an embodiment of the disclosure.
Figure 2:
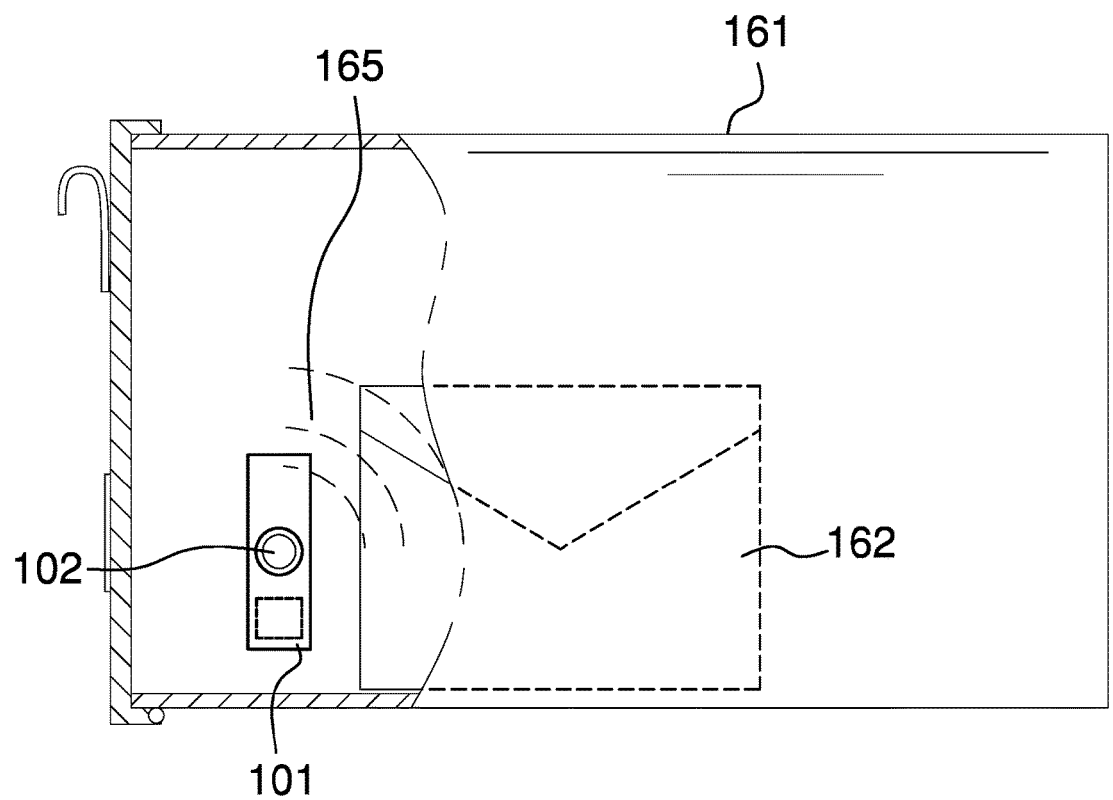
FIG. 2 is an in-use view of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to one or more potential embodiments of the disclosure, which are illustrated in FIGS. 1 through 5.

The postal delivery notification system 100 (hereinafter invention) is an instrument that is configured for use with a mailbox 161. The invention 100 is a sensor 102 that monitors the contents of the mailbox 161. The mailbox 161 is a container that is intended to receive and store parcels 162 delivered by the United States Post Office. Specifically, the invention 100 comprises a control system 101 and a sensor 102. The control system 101 and the sensor 102 are installed in the mailbox 161. The sensor 102 is mounted within the mailbox 161 such that when a parcel 162 is placed into or removed from the mailbox 161 the sensor 102 detects the addition or removal of the parcel 162 and sends an electrical signal to the control system 101. The parcel 162 refers to a specific item that is delivered by the United States Post Office. Upon detection of the electrical signal generated from the sensor 102 to the control system 101, the control system 101 initiates the generation of a first message 154. The control system 101 sends the first message 154 to an appropriate authority 163 using a wireless communication link 131 that is established with a commercially available wireless network 164. The appropriate authority 163 refers to a person or an organization that has been designated to receive the first message 154 that is generated and sent by the sensor 102. The wireless network 164 refers to a publically accessible commercial cellular communication network. The wireless network 164 is assumed to support SMS and MMS styles of communication. Messages sent between the control system 101 and the appropriate authority 163 over the wireless network 164 are assumed to be SMS or MMS compliant messages. The first message 154 informs the appropriate authority 163: 1) of the identity of the mailbox 161; and 2) that a parcel 162 has been introduced into or removed from the mailbox 161.

The control system 101 is an electronic device that: 1) monitors the sensor 102; and, 2) generates and sends a first message 154 to an appropriate authority 163 when the sensor 102 detects the introduction or removal of a parcel 162 into or out of the mailbox 161. The control system 101 comprises a logic module 111 and a communication module 112.

The logic module 111 is a programmable device that is used to manage, regulate, and operate the control system 101. The communication module 112 is a readily and commercially available wireless electronic communication device that communicates SMS and MMS messages between the logic module 111 and the appropriate authority 163 through a commercially provided and publically available cellular wireless network 164. The use of a commercially provided and publically available cellular wireless network 164 is preferred because: 1) of its low cost; 2) of its widespread availability and broad interoperability between competing publically available cellular wireless networks 164; and, 3) methods and techniques to send SMS and MMS messages over a publically available cellular wireless network 164 are well known and documented by those skilled in the electrical arts.

The wireless communication link 131 is a radio frequency communication link that is established by the communication module 112 to allow communication between the control system 101 and the wireless network 164. Methods to create radio frequency communication links between electronic devices and a commercially provided and publically available wireless network 164 are well known and documented in the electrical arts.

Figure 5:
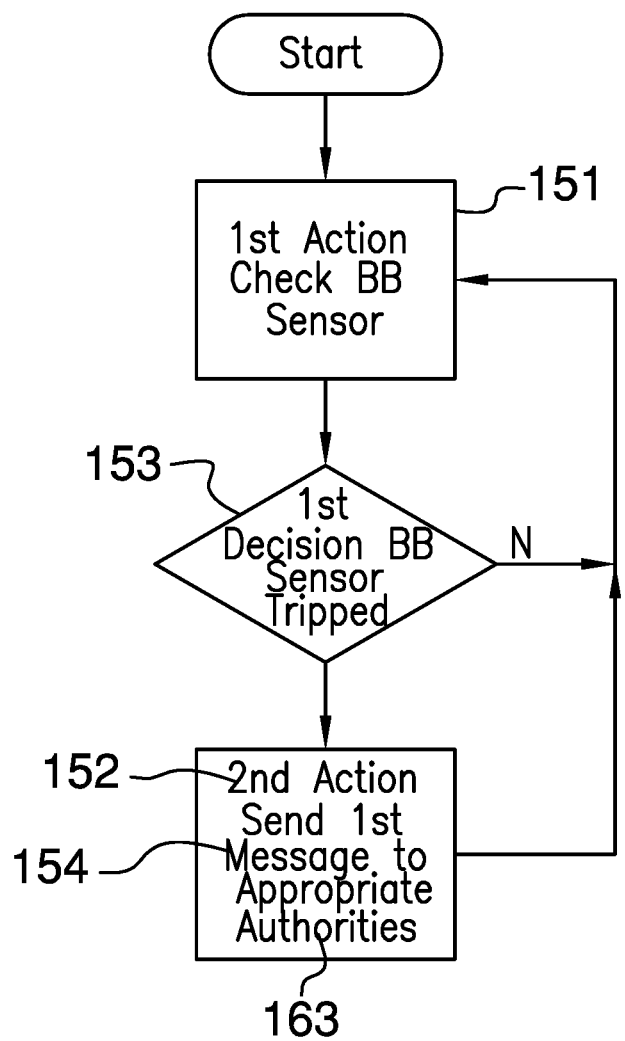
FIG. 5 is a flowchart of an embodiment of the disclosure.

The detailed operation of the control system 101, as shown most clearly in FIG. 5, is described in this paragraph. The logic module 111 takes a first action 151 to query the sensor 102 to check for activity. The logic module 111 makes a first decision 153 to determine whether the sensor 102 has been tripped by the introduction or removal of a parcel 162 from the mailbox 161. If the logic module 111 determines that the sensor 102 has not been tripped, the logic module 111 loops back to the first action 151. If the logic module 111 determines that the sensor 102 has been tripped, the logic module 111 takes a second action 152. The second action 152 comprises the logic module 111 sending the first message 154 over the wireless communication link 131 to the wireless network 164. The wireless network 164 then forwards the first message 154 to the appropriate authority 163. After completion of the second action 152 the logic module 111 loops back to the first action 151.

The sensor 102 is an electrical device that: 1) detects the introduction or removal of a parcel 162 into or out of the mailbox 161; and, 2) in response to the detection described in the first point generates an electrical signal that is detected by the logic module 111.

In the first potential embodiment of the disclosure, the sensor 102 comprises a break beam sensor 120. The break beam sensor 120 comprises a power source 121, a light source 122, and a photoswitch 123. The break beam sensor 120 is a device that detects an interruption in an electromagnetic beam 165. The break beam sensor 120 uses the electromagnetic beam 165 as a tripwire that detects an object that passes through the electromagnetic beam 165. The electromagnetic beam 165 refers to electromagnetic radiation, commonly referred to as light that is generated by the light source 122. The electromagnetic beam 165 is used to control the operation of the photoswitch 123.

The break beam sensor 120 and the electromagnetic beam 165 are positioned such that any parcel 162 that is introduced into or removed from the mailbox 161 will interrupt the electromagnetic beam 165 and thereby become detected by the break beam sensor 120. The break beam sensor 120 generates an electrical signal to the logic module 111 that indicates that this interruption of the electromagnetic beam 165 has occurred.

The general operation of the break beam sensor 120 is described in this paragraph. The power source 121 illuminates the light source 122. The power source 121 is an externally provided source of electrical power. The light source 122 is an electrical device that generates an electromagnetic beam 165 in the form of light. The photoswitch 123 is a light sensitive switch that is actuated by the presence of light in the form of the electromagnetic beam 165. The photoswitch 123 is monitored by the logic module 111 to detect when a parcel 162 is introduced into or removed from the mailbox 161. The photoswitch 123 is positioned within the mailbox 161 such that: 1) the light source 122 generates an electromagnetic beam 165 that falls upon the photoswitch 123; and, 2) the light source 122 is positioned relative to the photoswitch 123 such that a parcel 162 introduced into or removed from the mailbox 161 passes between the light source 122 and the photoswitch 123 in a manner that interrupts the electromagnetic beam 165. The interruption of the electromagnetic beam 165 causes the photoswitch 123 to actuate. The actuation of the photoswitch 123 is detected by the logic module 111 and is used to initiate the generation of the first message 154. The actuation of the photoswitch 123 is interpreted to mean that a parcel 162 has been introduced into or removed from the mailbox 161.

In the first potential embodiment of the disclosure, the break beam sensor 120 is implemented as described in this paragraph. The power source 121 comprises a limit resistor 141 and a battery 142. The light source 122 comprises an LED 143. The photoswitch 123 comprises a pull up resistor 144 and a phototransistor 145. The battery 142 is a readily and commercially available battery. The limit resistor 141 is a common electrical device. The LED 143 is a readily and commercially available electronic device that is used to generate the electromagnetic beam 165.

The phototransistor 145 is a readily and commercially available electronic device that operates in a manner similar to a transistor. The phototransistor 145 operates as switch. When an electromagnetic beam 165 is applied to the base, the phototransistor 145 will act like a closed switch allowing current to flow from the phototransistor collector 179 to the phototransistor emitter 180. When the electromagnetic beam 165 is removed from the base, the phototransistor 145 will act like an open switch disrupting current flow from the phototransistor collector 179 to the phototransistor emitter 180. The pull up resistor 144 is a common electrical device that is used to limit electric current flow through the phototransistor 145.

The break beam sensor 120 further comprises an electrical ground 146. The electrical ground 146 is a common reference voltage that is used in the electrical circuits associated with the break beam sensor 120. The break beam sensor 120 further comprises a mirror 147. The mirror 147 is a readily and commercially available reflective surface.

The limit resistor 141 is further defined with a first lead 171 and a second lead 172. The battery 142 is further defined with a battery cathode 175 and a battery anode 176. The LED 143 is further defined with a LED anode 177 and a LED cathode 178. The pull up resistor 144 is further defined with a third lead 173 and a fourth lead 174. The phototransistor 145 is further defined with a phototransistor collector 179 and a phototransistor emitter 180.

Figure 3:
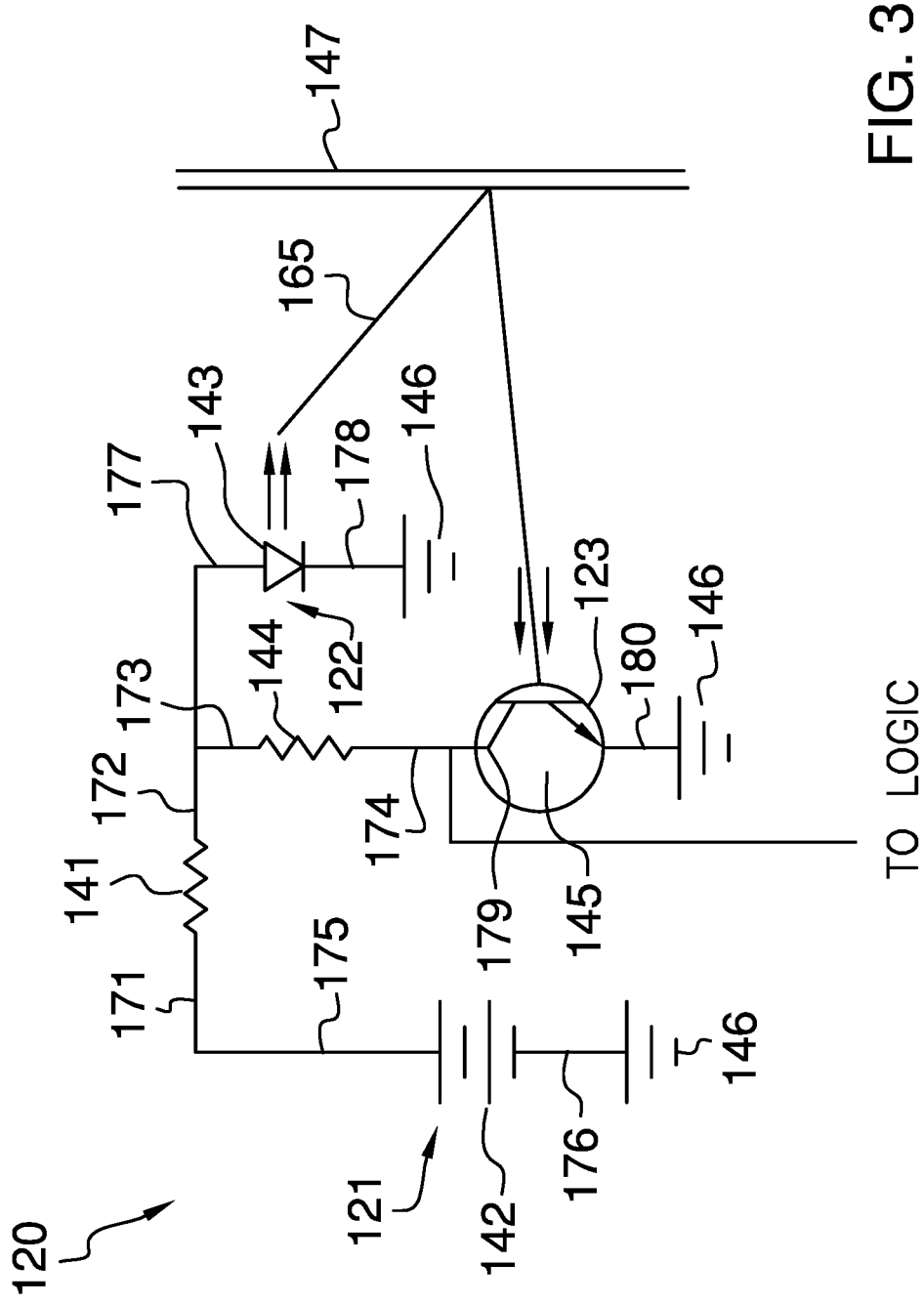
FIG. 3 is a schematic of an embodiment of the disclosure.
Figure 4:
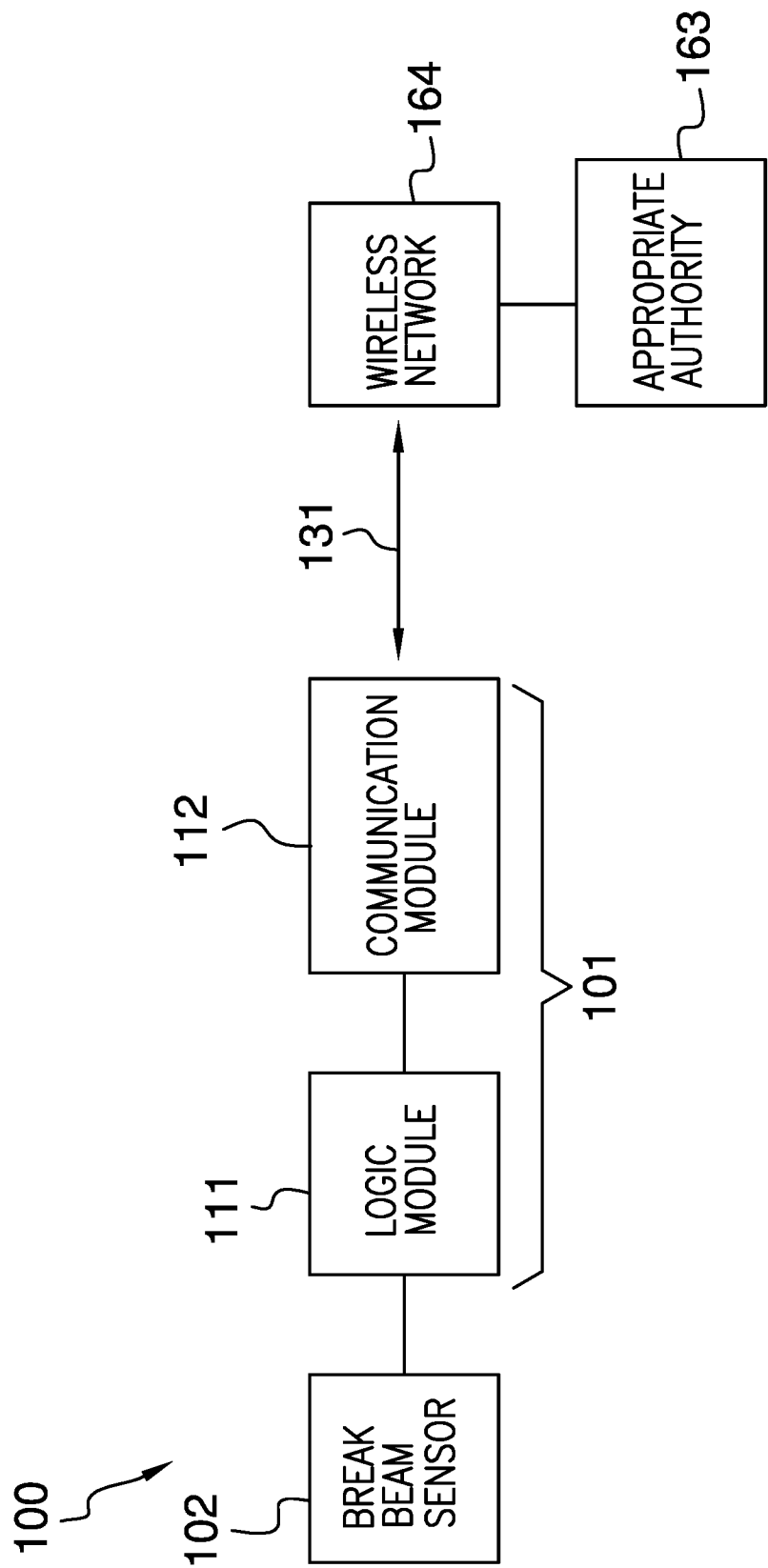
FIG. 4 is a block diagram of an embodiment of the disclosure.

As shown most clearly in FIG. 3, the break beam sensor 120 is assembled as described in this paragraph. The first lead 171 of the limit resistor 141 electrically connects to the battery cathode 175 of the battery 142. The second lead 172 of the limit resistor 141 electrically connects to the LED anode 177 of the LED 143. The third lead 173 of the pull up resistor 144 electrically connects to the LED anode 177 of the LED 143. The fourth lead 174 of the pull up resistor 144 electrically connects to the phototransistor collector 179 of the phototransistor 145. The fourth lead 174 of the pull up resistor 144 electrically connects to the logic module 111. The battery anode 176 of the battery 142 electrically connects to the electrical ground 146. The LED cathode 178 of the LED 143 electrically connects to the electrical ground 146. The phototransistor emitter 180 of the phototransistor 145 electrically connects to the electrical ground 146.

The detailed operation of the break beam sensor 120 used in the first potential embodiment of the disclosure is described in this paragraph and the following 4 paragraphs. The phototransistor 145 and the pull up resistor 144 perform the functions of the photoswitch 123. The LED 143 and the mirror 147 perform the functions of the light source 122. The battery 142 and the limit resistor 141 perform the functions of the power source 121. The purpose of the pull up resistor 144 is to limit current flow into the phototransistor 145 and the logic module 111. The purpose of the limit resistor 141 is to limit current flow into the phototransistor 145, the logic module 111, and the LED 143.

The break beam sensor 120 is set up such that the mirror 147 is mounted on a first vertical side of the mailbox 161 while the control system 101 and the break beam sensor 120 are mounted on a second vertical side of the mailbox 161 that is distal from the first vertical side.

As shown most clearly in FIG. 3, the mirror 147 is positioned within the mailbox 161 such that: 1) the electromagnetic beam 165 generated by the LED 143 is reflected off of the mirror 147 directly on to the phototransistor 145; and, 2) the mirror 147 and the phototransistor 145 are separated such that any parcel 162 introduced into the mailbox 161 will interrupt the electromagnetic beam 165.

When the electromagnetic beam 165 is not interrupted, the electromagnetic beam 165 activates the phototransistor 145 in much the same way that a base current would activate a transistor. The electromagnetic beam 165 causes the phototransistor 145 to act as a closed switch. In this mode, the phototransistor 145 acts as a short to the electrical ground 146 and causes the logic module 111 to read zero voltage across the phototransistor 145.

When the electromagnetic beam 165 is interrupted, the phototransistor 145 is deactivated causing the phototransistor 145 to act as an open switch. In this mode, the logic module 111 detects a voltage across the phototransistor 145, which initiates the generation and transmission of the first message 154.

The following definitions were used in this disclosure:

Anodes and Cathodes: As used in this disclosure, an anode and a cathode are the connecting terminals of an electrical circuit element or device. Technically, the cathode is the terminal through which the physical electrons flow into the device. The anode is the terminal through which the physical electrons flow out of the device. As a practical matter the anode refers to: 1) the positive terminal of a power consuming electrical circuit element; 2) the negative terminal of a discharging battery or an electrical power source; and, 3) the positive terminal of a charging battery. As a further practical matter the cathode refers to: 1) the negative terminal of a power consuming electrical circuit element; 2) the positive terminal of a discharging battery or an electrical power source; and, 3) the negative terminal of a charging battery.

Appropriate Authority: As used in this disclosure, an appropriate authority is person or organization that is designated to receive alarm or other notification messages regarding a monitored system or activity.

Battery: As used in this disclosure, a battery is a container consisting of one or more cells, in which chemical energy is converted into electricity and used as a source of power.

Break Beam Sensor: As used in this disclosure, a break beam sensor is a motion-sensing device. The break beam sensor comprises a beam generator and a beam detector. The beam generator generates a beam of electromagnetic radiation (visible or not visible) that detected by the beam detector. The beam of electromagnetic radiation forms a trip wire in the sense that if an object passes through the transmission of the beam of electromagnetic radiation is interrupted. This interruption of the beam of electromagnetic radiation is detected via the beam detector. The interruption of the beam of electromagnetic radiation is taken to imply that an object has moved through area within which the beam of electromagnetic radiation is transmitted.

Control System: As used in this disclosure, a control system is a first device or system that manages and regulates the behavior or operation of a second device or system.

Diode: As used in this disclosure, a diode is a two terminal semiconductor device that allows current flow in only one direction. The two terminals are called the anode and the cathode. Electric current is allowed to pass from the anode to the cathode.

Electrical Ground: As used in this disclosure, an electrical ground is a common reference voltage that is used in the design and implementation of electrical circuits. An electrical ground is often, but not necessarily, the discharge point of electric currents flowing through an electric circuit.

LED: As used in this disclosure, an LED is an acronym for a light emitting diode. A light emitting diode is a diode that is also a light source.

Logic Module: As used in this disclosure, a logic module is a readily and commercially available electrical device that is programmable and that accepts digital and analog inputs, processes the digital and analog inputs according to previously stored instruction and provides the results of these instructions as digital or analog outputs.

Mirror: As used in this disclosure, a mirror is a surface that is designed to reflect light with a minimum of dispersion or absorption. A mirror may or may not be formed with curved surfaces that are used to concentrate or disperse the light that reflects off the mirror.

Personal Data Device: As used in this disclosure, a personal data device is a handheld device that is used for managing personal information and communication. Examples of personal data device include, but are not limited to, cellular phones, tablets and smart phones.

Photoelectric: As used in this disclosure, photoelectric is an adjective used to describe an electronic component in which the performance of the electronic component is modified by light. Typical photoelectric devices include, but are not limited to, photoelectric transistors, photoelectric diodes, and photoelectric resistors.

Photoswitch: As used in this disclosure, a photoswitch is a switch that is actuated with light. The operation of a photoswitch is often based on the use of a photoelectric device.

Sensor: As used in this disclosure, a sensor is a device that receives and responds in a predetermined way to a signal or stimulus. As further used in this disclosure, a threshold sensor is a sensor that generates a signal that indicates whether the signal or stimulus is above or below a given threshold for the signal or stimulus.

SMS: As used in this disclosure, SMS is an abbreviation for short message service. The short message service is a service that is often provided with the cellular services that support personal data devices. Specifically, the SMS allows for the exchange of written messages between personal data devices. The SMS is commonly referred to as text messaging. A common enhancement of SMS is the inclusion of the delivery of multimedia services. This enhanced service is often referred to as Multimedia Media Services, which is abbreviated as MMS.

Switch: As used in this disclosure, a switch is an electrical device that starts and stops the flow of electricity through an electric circuit by completing or interrupting an electric circuit. The act of completing or breaking the electrical circuit is called actuation. Completing or interrupting an electric circuit with a switch is often referred to as closing or opening a switch respectively. Completing or interrupting an electric circuit is also often referred to as making or breaking the circuit respectively.

Transistor: As used in this disclosure, a transistor is a general term for a three terminal semiconducting electrical that is used for electrical signal amplification and electrical switching applications. There are several designs of transistors. A common example of a transistor is an NPN transistor that further comprises a collector terminal, an emitter terminal, and a base terminal and which consists of a combination of two rectifying junctions (a diode is an example of a rectifying junction). Current flowing from the collector terminal through the emitter terminal crosses the two rectifier junctions. The amount of the electric current crossing the two rectified junctions is controlled by the amount of electric current that flows through the base terminal.

With respect to the above description, it is to be realized that the optimum dimensional relationship for the various components of the invention described above and in FIGS. 1 through 5 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A signaling device comprising:
a control system and a sensor;
wherein the sensor is electrically connected to the control system;
wherein the control system and the sensor are installed in a mailbox;
wherein the sensor monitors the contents of the mailbox;
wherein the sensor is mounted within the mailbox such that when a parcel is placed into or removed from the mailbox the sensor detects the addition or removal of the parcel;
wherein the sensor sends an electrical signal to the control system;
wherein upon detection of the electrical signal generated from the sensor to the control system, the control system initiates the generation of a first message;
wherein the control system sends the first message to an appropriate authority;
wherein the control system sends the first message via a wireless network;
wherein the wireless network is a publically accessible cellular communication network;
wherein the wireless network supports SMS and MMS messages;
wherein the sensor comprises a break beam sensor;
wherein the break beam sensor comprises a power source, a light source, and a photoswitch;
wherein the light source generates an electromagnetic beam;
wherein the break beam sensor uses the electromagnetic beam as a tripwire that detects a parcel that passes through the electromagnetic beam;
wherein the power source comprises a limit resistor and a battery;
wherein the light source comprises an LED;
wherein the photoswitch comprises a pull up resistor and a phototransistor;
wherein the limit resistor is further defined with a first lead and a second lead;
wherein the battery is further defined with a battery cathode and a battery anode;
wherein the LED is further defined with a LED anode and a LED cathode;
wherein the pull up resistor is further defined with a third lead and a fourth lead;
wherein the phototransistor is further defined with a phototransistor collector and a phototransistor emitter.

2. The signaling device according to claim 1
wherein the control system comprises a logic module and a communication module;
wherein the logic module and the communication module are electrically connected;
wherein the logic module is a programmable device;
wherein the communication module is a wireless electronic communication device that establishes a wireless communication with the wireless network;
wherein the wireless communication link is a radio frequency communication link that is established by the communication module to allow communication between the control system and the wireless network;
wherein the control system sends the first message to the appropriate authority through the wireless communication link that is established with a commercially available wireless network.

3. The signaling device according to claim 2
wherein in response to the detection of the introduction or removal of the parcel into and out of the mailbox the sensor generates the electrical signal that is detected by the logic module.

4. The signaling device according to claim 3
wherein the electromagnetic beam controls the operation of the photoswitch;
wherein the break beam sensor and the electromagnetic beam are positioned such that any parcel that is introduced into and removed from the mailbox will interrupt the electromagnetic beam and thereby become detected by the break beam sensor;

wherein the break beam sensor generates the electrical signal that is detected by the logic module.

5. The signaling device according to claim 4
wherein the power source illuminates the light source;
wherein the light source is an electrical device that generates an electromagnetic beam in the form of light;
wherein the photoswitch is a light sensitive switch that is actuated by the presence of light in the form of the electromagnetic beam;
wherein the photoswitch is monitored by the logic module.

6. The signaling device according to claim 5
wherein the photoswitch is positioned within the mailbox such that the light source generates an electromagnetic beam that falls upon the photoswitch;
wherein the light source is positioned relative to the photoswitch such that a parcel introduced into and removed from the mailbox passes between the light source and the photoswitch in a manner that interrupts the electromagnetic beam;
wherein the interruption of the electromagnetic beam causes the photoswitch to actuate;
wherein the actuation of the photoswitch is detected by the logic module.

7. The signaling device according to claim 6
wherein the break beam sensor further comprises an electrical ground;
wherein the first lead of the limit resistor electrically connects to the battery cathode of the battery;
wherein the second lead of the limit resistor electrically connects to the LED anode of the LED;
wherein the third lead of the pull up resistor electrically connects to the LED anode of the LED;
wherein the fourth lead of the pull up resistor electrically connects to the phototransistor collector of the phototransistor;
wherein the fourth lead of the pull up resistor electrically connects to the logic module;
wherein the battery anode of the battery electrically connects to the electrical ground;
wherein the LED cathode of the LED electrically connects to the electrical ground;
wherein the phototransistor emitter of the phototransistor electrically connects to the electrical ground.

8. The signaling device according to claim 7
wherein the break beam sensor further comprises a mirror;
wherein the mirror is a reflective surface;
wherein the break beam sensor is set up such that the mirror is mounted on a first vertical side of the mailbox while the control system and the break beam sensor are mounted on a second vertical side of the mailbox that is distal from the first vertical side.

9. The signaling device according to claim 8
wherein the mirror is positioned within the mailbox such that the electromagnetic beam generated by the LED is reflected off of the mirror directly on to the phototransistor;
wherein the mirror and the phototransistor are separated such that a parcel will interrupt the electromagnetic beam when introduced into the mailbox.

10. The signaling device according to claim 1
wherein the control system comprises a logic module and a communication module;

wherein in response to the detection of the introduction or removal of the parcel into and out of the mailbox the sensor generates the electrical signal that is detected by the logic module.

11. The signaling device according to claim 1
wherein the electromagnetic beam controls the operation of the photoswitch;
wherein the break beam sensor and the electromagnetic beam are positioned such that any parcel that is introduced into and removed from the mailbox will interrupt the electromagnetic beam and thereby become detected by the break beam sensor;
wherein the control system comprises a logic module and a communication module;
wherein the break beam sensor generates the electrical signal to the logic module.

12. The signaling device according to claim 11
wherein the power source illuminates the light source;
wherein the light source generates an electromagnetic beam in the form of light;
wherein the photoswitch is a light sensitive switch that is actuated by the presence of light in the form of the electromagnetic beam;
wherein the photoswitch is monitored by the logic module.

13. The signaling device according to claim 12
wherein the photoswitch is positioned within the mailbox such that the light source generates the electromagnetic beam that falls upon the photoswitch;
wherein the light source is positioned relative to the photoswitch such that a parcel introduced into and removed from the mailbox passes between the light source and the photoswitch in a manner that interrupts the electromagnetic beam;
wherein the interruption of the electromagnetic beam causes the photoswitch to actuate;
wherein the actuation of the photoswitch is detected by the logic module.

14. The signaling device according to claim 13
wherein the break beam sensor further comprises an electrical ground;
wherein the first lead of the limit resistor electrically connects to the battery cathode of the battery;
wherein the second lead of the limit resistor electrically connects to the LED anode of the LED;
wherein the third lead of the pull up resistor electrically connects to the LED anode of the LED;
wherein the fourth lead of the pull up resistor electrically connects to the phototransistor collector of the phototransistor;
wherein the fourth lead of the pull up resistor electrically connects to the logic module;
wherein the battery anode of the battery electrically connects to the electrical ground;
wherein the LED cathode of the LED electrically connects to the electrical ground;
wherein the phototransistor emitter of the phototransistor electrically connects to the electrical ground.

15. The signaling device according to claim 14
wherein the break beam sensor further comprises a mirror;
wherein the mirror is a reflective surface;
wherein the break beam sensor is set up such that the mirror is mounted on a first vertical side of the mailbox while the control system and the break beam sensor are mounted on a second vertical side of the mailbox that is distal from the first vertical side;

wherein the mirror is positioned within the mailbox such that the electromagnetic beam generated by the LED is reflected off of the mirror directly on to the phototransistor;

wherein the mirror and the phototransistor are separated such that a parcel will interrupt the electromagnetic beam when introduced into the mailbox.

\* \* \* \* \*